Sept. 17, 1963 W. J. HEACOCK, JR 3,104,358
MEMORY CIRCUIT WITH POSITIVE AND NEGATIVE LIMITERS
Filed Oct. 5, 1959
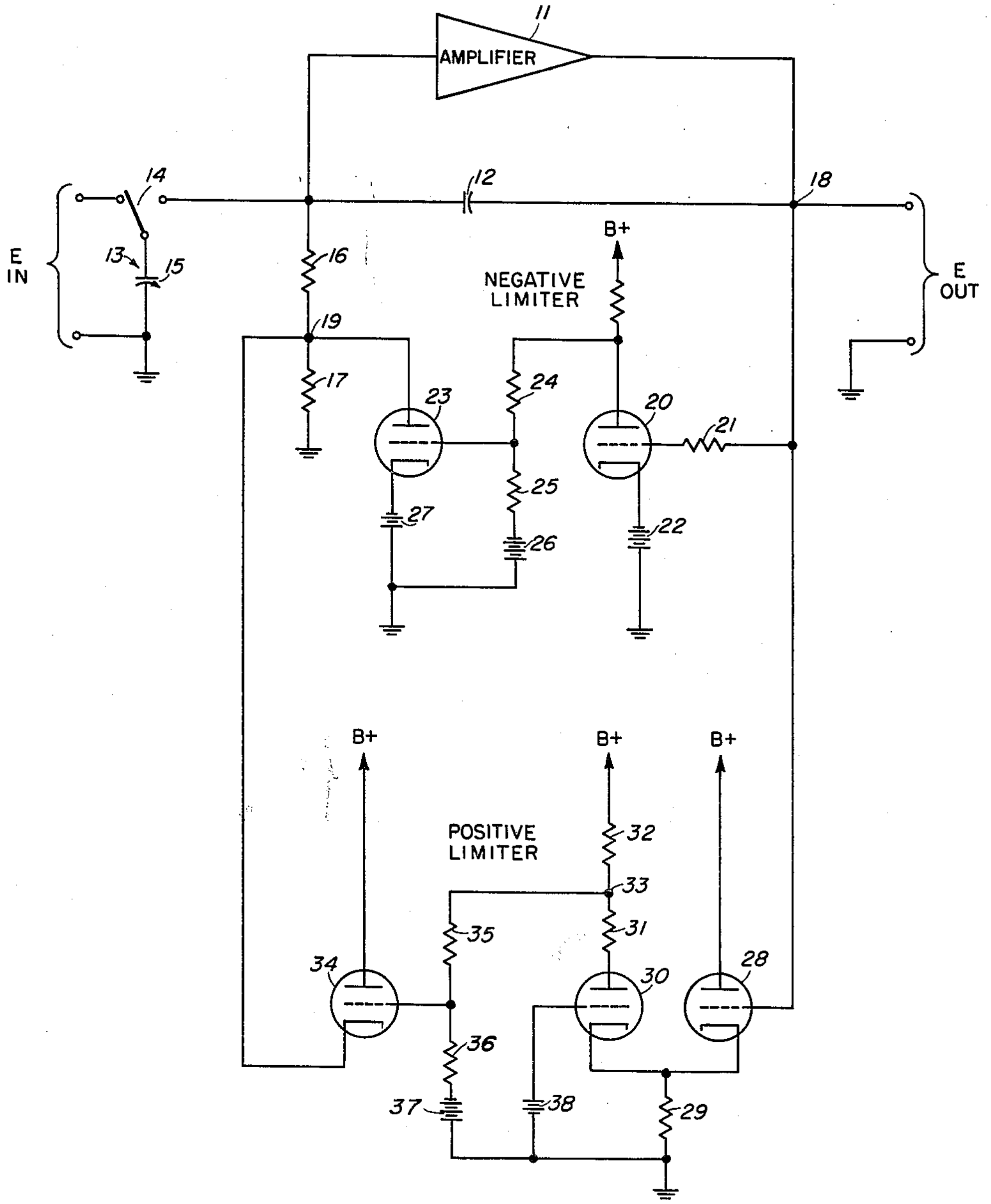
INVENTOR.
WILLIAM J. HEACOCK, JR.
BY
ATTORNEYS 3,104,358
MEMORY CIRCUIT WITH POSITIVE AND NEGATIVE LIMITERS William J. Heacock, Jr., Levittown, N.Y., assignor, by mesne assignments, to the United States of America as represented by the Secretary of the Navy Filed Oct. 5, 1959, Ser. No. 844,598
5 Claims. (Cl. 328—175)

The present invention relates generally to memory circuits with positive and negative limiters and more particularly to a memory circuit having a feedback amplifier which has its output voltage limited to a given range by means of a second feedback leakage current.

Sometimes it becomes necessary to control and limit the output from a memory circuit. Probably an obvious solution to this problem and one already anticipated by the prior art is to connect a diode biased by a potential source, such as a battery, across the storage element of the capacitive type or the equivalent. Although a simple expedient for some purposes, it is limited in its applications to practically laboratory conditions because of the excessive leakage currents that can flow between the heater and cathode of a heater-equipped vacuum diode. In addition, a second diode parallel connected in the opposite direction with the aforesaid diode would only aggravate the current leakage situation. This leakage also comes about due to the unavoidable leakage paths which inevitably exist across the terminals of the sockets used to hold the tubes and across the envelopes of the tubes themselves. Inasmuch as the total allowable shunt resistance for most memory circuit applications must be less than 100,000 megohms, the aforementioned prior art device would not appear to be universally satisfactory due to the violation of such value during normal operating conditions.

The present invention substantially eliminates most of the adverse affects encountered in the diode shunting type of limiter by employing various circuit isolation techniques which reduce undesirable leakage path resistance. This is accomplished by shunting the storage and amplifier devices of the memory circuit with a unique circuit comprising a negative non-linear limiter composed of two cascaded stages of appropriately biased triodes and a positive non-linear limiter containing three cascaded stages of appropriately biased triodes. In addition to shunting the memory circuit, said positive and negative limiters are connected in parallel with each other to provide feedback as necessary to regulate, control, and effectively maintain the desired memory potential range.

It is, therefore, an important object of this invention to prevent the output of a memory device from deviating excessively in a positive direction from an arbitrary reference voltage.

Another object of this invention is to provide an improved limiter for a memory circuit which permits the output thereof from deviating excessively in a positive direction from a first predetermined reference voltage and in a negative direction from a second predetermined reference voltage which is more negative than said first predetermined reference voltage.

Another object of this invention is to provide feedback control to a memory circuit through a low leakage resistance path.

Another object of this invention is to limit the output of a memory circuit with minimum collateral interference by the limiting circuitry.

Another object and many of the attendant advantages of this invention will be readily appreciated as the same becomes better understood by reference to the following detailed description when considered in conjunction with the accompanying drawing wherein:

The FIGURE is a schematic diagram of the combined memory and limiting circuits constituting a preferred embodiment of the invention.

Referring now to the drawing, there is shown in the figure amplifier 11 connected in parallel across a storage capacitor 12. An input voltage, $E_{in}$, is applied to a transfer circuit 13 between a single pole double throw switch 14 series connected with a variable capacitor 15 and ground. A voltage divider network including series coupled resistors 16 and 17 is connected between the input junction of a parallel connected memory amplifier 11 and a storage capacitor 12 and ground. Between an interconnecting junction 19 of voltage divider resistors 16 and 17 and output junction 18 from the memory circuit containing parallel connected amplifier 11 and storage capacitor 12 are connected two limiter circuits, one for limiting the memory circuit output voltage deviation in a positive direction from a predetermined reference value and another for limiting the memory circuit output voltage deviation in a negative direction from said predetermined reference value.

The negative limiter includes a triode 20 having a cathode, a grid, and a plate with the grid coupled to the output voltage of the memory circuit through a grid resistor 21, the plate connected to a B plus voltage source through a plate resistor, and the cathode connected to the negative terminal of a D.C. potential source 22 such as a battery. The positive terminal of battery 22 is grounded.

The plate of triode 20 is coupled to the grid of a triode 23 through a resistor 24 of a voltage divider network. The grid of triode 23 is also connected through a resistor 25 to the negative terminal of a D.C. voltage source 26 for bias purposes, the positive terminal of said D.C. voltage source being grounded. The cathode of triode 23 is connected to the negative pole of a D.C. voltage source 27, the positive pole of which is grounded. The plate of triode 23 is coupled to junction 19 to complete the shunting of amplifier 11 and storage capacitor 12 by the negative limiter circuit.

The positive limiter includes a triode 28, the grid of which is electrically coupled to the grid of negative limiter triode 20 and to output junction 18 of the memory circuit. The plate of triode 28 is connected to a B plus voltage source and the cathode thereof is connected to ground through a cathode resistor 29. Coupled from triode 28 is a triode 30 whose cathode is coupled to the cathode thereof in cathode follower connection manner. The plate of triode 30 is connected to B plus through a voltage divider network including series connected resistors 31 and 32 having an interconnection junction 33 which, in turn, is connected to the grid of a triode 34 through a resistor 35. The grid of triode 34 is also coupled through a bias resistor 36 to the negative terminal of a D.C. voltage source 37, the positive terminal of which is grounded. The grid of triode 30 is biased appropriately by being connected to the positive terminal of a D.C. voltage source 38, the negative terminal of which is grounded. The plate of triode 34 is connected to a B plus, and the cathode is connected to ground through resistor 17. The cathode of triode 34 is also connected to junction 19 in order to complete the connection of the positive limiter circuit through the aforementioned resistor 16 to the input of the memory circuit, thereby completing the shunting thereof by the positive limiter.

Briefly, the operation of the circuit constituting this invention is as follows: It works by virtue of a number of predetermined operational conditions, viz., the limiter does not have to work on an instantaneous basis, that is, input error information is presented periodically such as every 10 seconds and the limiter only has to restore the output voltage to the limited level a short time after the error transfer which may actually be only one or two seconds;

the input of the storage capacitor shunting memory amplifier is normally very close to ground potential, since it ordinarily only varies due to drift, if any, in the operating potential of the associated equipment actually providing the input thereto; and due to the fact that the memory circuit output voltage can drift at a very slow rate towards a more stable output voltage not requiring electronic clamping or other ancillary regulation means.

Resistance 16 is a large resistance and may be of the order of 40 megohms or higher as determined by expected variations in the input potential and the allowable current that can pass through the circuit of and stored in storage capacitor 12. Resistance 16 is connected between the input and ground through a relatively small resistor 17 which may be of the order of approximately 15,000 ohms. Normally cut off non-linear amplifier 23 has its output connected to the junction between resistors 16 and 17 which allows amplifier 23 to conduct quite a bit of current without causing a prohibitive amount of current to flow through resistor 16 and into amplifier 11 due to the small value of resistor 17 as compared to the large value of resistor 16.

When the output voltage from the memory circuit decreases to about the potential of battery 22 as a result of repeated positive error voltages being transferred from condenser 15, triode 20 starts to decrease its grid current with grid resistor 21 of triode 20 limiting the grid current thereof and thus preventing undue loading on the memory circuit output. As the conduction of triode 20 is reduced, the rising plate potential thereof is coupled via resistors 24 and 25 to the grid of triode 23. When the potential at the grid of triode 23 rises to within a few volts of battery 27 located in the cathode circuit of triode 23, triode 23 conducts zero bias plate current and causes the potential at the junction of resistors 16 and 17 to drop below ground. This causes a current flow through resistor 16. Since no current enters the grid of input tube of amplifier 11, the current flows in the circuit of storage capacitor 12 and causes the output potential of the memory circuit to be restored to within a few volts of battery 22. Due to the high gain of triode 20, triode 23 is kept in grid current and its plate is kept low so that maximum potential current is passed through resistor 16 to restore the output to a value close to said battery 22. Hence, the discharge is a constant current discharge until the output gets close to the voltage of battery 22 after which the final settling is exponential.

The final mode of operation of the subject circuit actually depends on the memory voltage to be stored by capacitor 12 being close to the voltage of battery 22, the grid current of the memory amplifier 11, and the maximum current triode 23 can pass with its grid far negative. The stray leakage resistance between the input of the subject circuit and ground may be neglected, as it will normally have a negligible effect compared to the effect of the large resistance of resistor 16.

First, assume that the actual D.C. operating point at the memory circuit input grid is slightly negative and of perhaps the order of .2 volt with respect to ground due to tube drift or perhaps tube choice. Also, assume that the plate current of triode 23 can be reduced to the point where, when it flows through resistor 17, it develops a smaller voltage than the operating point voltage of the memory circuit. In this case, the limiting action will continue and the voltage across storage capacitor 12 will change until the memory circuit output voltage returns close enough to the potential of battery 22 so that the voltage drop across resistor 17 just equals the negative D.C. operating potential of the memory amplifier input. At this point no current flows through resistor 16 and the memory's output voltage no longer changes. In event that some grid current may be drawn by the memory amplifier, it will be so small that it will not have any adverse effect upon the operation. Now the memory amplifier and the D.C. coupled limiter form a stable D.C. coupled circuit. High frequency oscillation will not occur, inasmuch as the large capacitance at storage capacitor 12 quite effectively shorts out triodes 20 and 23 so that the high frequency circuit still consists mainly of just the memory amplifier which, of course, has been designed to be stable. It should be noted that when the first error signal having a polarity to drive the memory into the normal useful range is transferred into the memory circuit, triode 20 will be driven to drawing grid current, triode 23 will be cut off and the circuit will reverse to the non-limited condition which may involve some normal constant drift due to the small grid current of the memory amplifier 11 and also due to the fact that there is normally a small voltage across resistor 16. However, such drift, if any, will fall within the limits that are allowable during normal operations.

Next, assume that the actual D.C. operating point at the memory circuits input is slightly positive of perhaps the order of .2 volt with respect to ground. Now even if the plate current of triode 23 were completely cut off, its plate voltage could not rise to .2 volt above ground due to the ground return of resistor 17. In this case, a current will flow through resistors 16 and 17 and capacitor 12. This current is of such a polarity as to gradually drift the memory circuit output back into the normal range of operation of the memory. In this case, though, the gradual drift is still within the allowable drift limits of the memory output and hence is not objectionable. In case the operating grid voltage of the memory circuit exactly equals the plate voltage of triode 23 when it is cut off, the memory will settle to an output voltage which differs from that of battery 22 by just the amount which will cause triode 23 to be cut off, if the consideration of the grid current, if any, of the memory amplifier's input tube is neglected. Another way to look at the circuit is to consider that the D.C. current into the memory amplifier dictates the limiter's connection to the input thereof, but since this current cannot vary during the normal range of the memory's circuit output voltage, there is effectively no dynamic leakage resistance connected across the storage capacitor 12. Outside the useful voltage range, there is a path having a large equivalent transconductance between the memory's output and its input, hence, output limiting is accomplished without the prohibitive leakage complications of a simple diode shunting arrangement.

The positive direction limiter works on substantially the same principle as the aforementioned negative output limiter. When the memory circuit output is driven within a few volts of the potential of battery 37, triode 28 starts conducting and causes the plate potential of triode 30 to rise. This drives the grid of the normally cut off cathode follower 34 high enough to make it conduct and raise the potential at the junction of resistors 16 and 17. In a manner similar to that discussed previoiusly, depending on the exact operating grid voltage of the memory input and how low the voltage at the junction of triode 20 and triode 23 can go, the memory circuits output voltage is driven back down to and held at the limiting level or the output is first driven down to the limiting level and then slowly creeps negatively into the usual output voltage range of the memory circuit. It should be noted here that to get the best possible operation when the potential of battery 37 is not at ground potential, it may be advisable to ground the grid of triode 30 and use a voltage displacing divider to drive the grid of triode 28 to provide a suitable voltage difference between the cathode of triode 30 and B plus to permit inserting a fair size plate load resistor and allow for tolerances on the voltage displacing divider driving the grid of triode 34. It should now be seen that the use of the relatively small resistance of resistor 17 in conjunction with the relatively large resistance of resistor 16 enables large amounts of heater-to-cathode leakage within cathode follower triode 34 to be tolerated without adversely affecting the resistance balance of the entire memory circuit.

It should be understood, of course, that the foregoing disclosure relates only to a preferred embodiment of the invention and that numerous modifications or alterations may be made therein without departing from the spirit and scope of the invention as set forth in the appended claims.

What is claimed is:

1. A voltage limiter system for a memory circuit comprising in combination, means for storing a memory voltage, a direct coupled amplifier channel connected in parallel with said memory voltage storing means, a voltage divider network connected between the input of said amplifier channel and ground, said voltage divider network including a pair of series connected resistors one of which has a large resistanec compared to the resistance of the other, means coupled to the output of said amplifier channel for preventing undue electrical loading thereof, a pair of cascaded triodes interconnecting said last mentioned means and the common junction of the series connected resistors of the aforesaid voltage divider network, and means shunting said parallel connected memory voltage storage means and said amplifier channel for limiting the positive deviation of said memory voltage from a predetermined value.

2. The device of claim 1 wherein said means for storing a memory voltage consists of a capacitor.

3. A voltage limiter system for a memory circuit comprising in combination, means for storing a memory voltage, an amplifier coupled in parallel with asid memory voltage storing means, a voltage divider network connected between the input of said amplifier and ground, said voltage divider network including a pair of series connected resistors one of which has a large resistance compared to the resistance of the other, means coupled to the output of said amplifier channel for preventing the undue electrical loading thereof, a trio of triode stages cascaded between the output of said amplifier channel and the junction of the series connected resistors of said voltage divider network for limiting the positive deviation of said memory voltage from a predetermined voltage level, and means interconnecting said junction of the series connected resistors of said voltage divider network and the aforesaid undue electrical loading prevention means for limiting the negative deviation of asid memory voltage from said predetermined voltage level.

4. The device of claim 3 wherein the means for storing a memory voltage consists of a capacitor.

5. A positive and negative voltage limiter system for a memory circuit comprising in combination, an amplifier, a capacitor connected in parallel with said amplifier, a voltage divider network connected between the input of said amplifier and ground, said voltage divider network consisting of a pair of series connected resistors one of which has a large resistance compared to the other, a load resistor coupled to the output of said amplifier, a first triode having a cathode, a plate, and a grid, with the grid thereof coupled to said load resistor, the cathode thereof coupled to ground through a direct current power supply, and the plate thereof coupled to a B+ voltage through a second resistor, a second triode having a grid resistance coupled to the plate of said first triode, a cathode coupled through a direct current power supply to ground, and a plate connected to the common junction of said piar of resistors of the aforesaid voltage divider network, means coupled between ground and the grid of said second triode for biasing same, a third triode having a plate coupled to a B+ voltage, a cathode connected to the common junction of said pair of resistors of the aforesaid voltage divider network, and a grid, a fourth triode having a grid connected to the output of said amplifier, a plate coupled to a B+ voltage and a cathode, a fifth triode havign a plate, a grid, and a cathode with the cathode thereof connected to the cathode of said fourth triode, a resistor coupled between the interconnected cathodes of said fourth and fifth triodes and ground, a direct current power supply connected between the grid of said fifth triode and ground, a pair of series connected resistors connected between the plate of said fifth triode and a B+ voltage, another resistor interconnecting the grid of said third triode and the common junction of said series connected resistors, and means coupled between the grid of said third triode and ground for biasing said third triode.

References Cited in the file of this patent

UNITED STATES PATENTS

| | | |
|---|---|---|
| 2,552,206 | Mayer | May 8, 1951 |
| 2,762,965 | Walker | Sept. 11, 1956 |
| 2,861,239 | Gilbert | Nov. 18, 1958 |